(12) United States Patent
Lam et al.

(10) Patent No.: US 8,104,076 B1
(45) Date of Patent: Jan. 24, 2012

(54) APPLICATION ACCESS CONTROL SYSTEM

(75) Inventors: Josiah Lam, Kwun Tong (HK); Mark D. McGovern, Toms River, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1345 days.

(21) Appl. No.: 11/559,081

(22) Filed: Nov. 13, 2006

(51) Int. Cl.
- *G06F 7/04* (2006.01)
- *G06F 15/16* (2006.01)
- *G06F 17/30* (2006.01)
- *H04L 29/06* (2006.01)

(52) U.S. Cl. ............... 726/8; 726/3; 713/182
(58) Field of Classification Search ............... 726/8
See application file for complete search history.

(56) References Cited

U.S. PATENT DOCUMENTS

| | | | |
|---|---|---|---|
| 3,872,448 A | 3/1975 | Mitchell, Jr. | |
| 4,652,990 A * | 3/1987 | Pailen et al. | 705/56 |
| 5,159,687 A | 10/1992 | Richburg | |
| 5,168,444 A | 12/1992 | Cukor et al. | |
| 5,278,982 A | 1/1994 | Daniels et al. | |
| 5,313,616 A | 5/1994 | Cline et al. | |
| 5,347,518 A | 9/1994 | Lee | |
| 5,455,946 A | 10/1995 | Mohan et al. | |
| 5,630,173 A | 5/1997 | Oprescu | |
| 5,684,950 A * | 11/1997 | Dare et al. | 726/10 |
| 5,701,471 A | 12/1997 | Subramanyam | |
| 5,748,878 A | 5/1998 | Rees et al. | |
| 5,752,034 A | 5/1998 | Srivastava | |
| 5,758,061 A | 5/1998 | Plum | |
| 5,764,972 A | 6/1998 | Crouse et al. | |
| 5,774,553 A | 6/1998 | Rosen | |
| 5,784,557 A | 7/1998 | Oprescu | |
| 5,787,402 A | 7/1998 | Potter et al. | |
| 5,828,883 A | 10/1998 | Hall | |
| 5,832,523 A | 11/1998 | Kanai et al. | |
| 5,835,770 A | 11/1998 | Shum et al. | |
| 5,845,293 A | 12/1998 | Veghte et al. | |
| 5,872,976 A | 2/1999 | Yee et al. | |
| 5,907,846 A | 5/1999 | Berner et al. | |
| 5,920,719 A | 7/1999 | Sutton et al. | |
| 5,978,477 A | 11/1999 | Hull et al. | |

(Continued)

FOREIGN PATENT DOCUMENTS

WO WO 95/03586 2/1995

(Continued)

OTHER PUBLICATIONS

Duggan, 2.40 General—Reviews and Abstracts, SPI Database of Software Technologies, p. 1-5, Feb. 1, 1974.

(Continued)

*Primary Examiner* — Taghi Arani
*Assistant Examiner* — Narciso Victoria
(74) *Attorney, Agent, or Firm* — Hunton & Williams LLP

(57) ABSTRACT

A system for application access control is disclosed. First. a business coordinator needs to register a user developed tool (UDT) containing an application to be protected with the system via a software program. After registration. a random encrypted password is generated by the application access control server and stored in its back-end database as well as a local break-glass database corresponding to the UDT. When an entitled user accesses the application in the registered UDT later on, the system will check whether he/she is entitled to access the requested application. If yes. the system will retrieve the encrypted password for that application and thus launch the application.

13 Claims, 13 Drawing Sheets

U.S. PATENT DOCUMENTS

| | | | |
|---|---|---|---|
| 6,009,405 A | 12/1999 | Leymann et al. | |
| 6,012,087 A | 1/2000 | Freivald et al. | |
| 6,014,671 A | 1/2000 | Castelli et al. | |
| 6,026,237 A | 2/2000 | Berry et al. | |
| 6,029,002 A | 2/2000 | Afifi et al. | |
| 6,058,393 A | 5/2000 | Meier et al. | |
| 6,065,009 A | 5/2000 | Leymann et al. | |
| 6,081,808 A | 6/2000 | Blackman et al. | |
| 6,108,698 A | 8/2000 | Tenev et al. | |
| 6,125,390 A | 9/2000 | Touboul | |
| 6,138,112 A | 10/2000 | Slutz | |
| 6,145,121 A | 11/2000 | Levy et al. | |
| 6,163,776 A | 12/2000 | Periwal | |
| 6,188,400 B1 | 2/2001 | House et al. | |
| 6,226,652 B1 | 5/2001 | Percival et al. | |
| 6,237,143 B1 | 5/2001 | Fontana et al. | |
| 6,243,862 B1 | 6/2001 | Lebow | |
| 6,256,635 B1 | 7/2001 | Arrouye et al. | |
| 6,263,121 B1 | 7/2001 | Melen et al. | |
| 6,266,683 B1 | 7/2001 | Yehuda et al. | |
| 6,269,479 B1 | 7/2001 | Puram | |
| 6,271,844 B1 * | 8/2001 | Selles | 715/853 |
| 6,279,008 B1 | 8/2001 | Tung Ng et al. | |
| 6,301,701 B1 | 10/2001 | Walker et al. | |
| 6,311,320 B1 | 10/2001 | Jibbe | |
| 6,311,327 B1 | 10/2001 | O'Brien et al. | |
| 6,336,122 B1 | 1/2002 | Lee et al. | |
| 6,356,920 B1 | 3/2002 | Vandersluis | |
| 6,381,609 B1 | 4/2002 | Breitbart et al. | |
| 6,385,618 B1 | 5/2002 | Ng et al. | |
| 6,397,221 B1 | 5/2002 | Greef et al. | |
| 6,405,209 B2 | 6/2002 | Obendorf | |
| 6,411,957 B1 | 6/2002 | Dijkstra | |
| 6,418,446 B1 | 7/2002 | Lection et al. | |
| 6,418,448 B1 | 7/2002 | Sarkar | |
| 6,418,451 B1 | 7/2002 | Maimone | |
| 6,449,623 B1 | 9/2002 | Bohannon et al. | |
| 6,453,310 B1 | 9/2002 | Zander | |
| 6,456,995 B1 | 9/2002 | Salo et al. | |
| 6,467,052 B1 | 10/2002 | Kaler et al. | |
| 6,477,540 B1 | 11/2002 | Singh et al. | |
| 6,490,581 B1 | 12/2002 | Neshatfar et al. | |
| 6,502,095 B2 | 12/2002 | Breitbart et al. | |
| 6,502,104 B2 | 12/2002 | Fung et al. | |
| 6,532,467 B1 | 3/2003 | Brocklebank et al. | |
| 6,535,894 B1 | 3/2003 | Schmidt et al. | |
| 6,539,337 B1 | 3/2003 | Provan et al. | |
| 6,539,383 B2 | 3/2003 | Charlet et al. | |
| 6,539,397 B1 | 3/2003 | Doan et al. | |
| 6,539,398 B1 | 3/2003 | Hannan et al. | |
| 6,557,039 B1 | 4/2003 | Leong et al. | |
| 6,571,249 B1 | 5/2003 | Garrecht et al. | |
| 6,574,640 B1 | 6/2003 | Stahl | |
| 6,578,129 B1 | 6/2003 | da Silva Junior et al. | |
| 6,591,260 B1 | 7/2003 | Schwarzhoff et al. | |
| 6,601,075 B1 | 7/2003 | Huang et al. | |
| 6,651,076 B1 | 11/2003 | Asano | |
| 6,665,086 B2 | 12/2003 | Hull et al. | |
| 6,678,705 B1 | 1/2004 | Berchtold et al. | |
| 6,681,380 B1 | 1/2004 | Britton et al. | |
| 6,691,139 B2 | 2/2004 | Ganesh et al. | |
| 6,697,835 B1 | 2/2004 | Hanson et al. | |
| 6,701,514 B1 | 3/2004 | Haswell et al. | |
| 6,711,594 B2 | 3/2004 | Yano et al. | |
| 6,714,219 B2 | 3/2004 | Lindhorst et al. | |
| 6,763,384 B1 | 7/2004 | Gupta et al. | |
| 6,826,696 B1 * | 11/2004 | Chawla et al. | 726/4 |
| 6,880,010 B1 | 4/2005 | Webb et al. | |
| 6,910,064 B1 * | 6/2005 | Astarabadi et al. | 709/203 |
| 6,918,013 B2 | 7/2005 | Jacobs et al. | |
| 6,938,072 B2 | 8/2005 | Berman et al. | |
| 7,610,617 B2 * | 10/2009 | Kelly et al. | 726/5 |
| 2002/0007287 A1 | 1/2002 | Straube et al. | |
| 2002/0029228 A1 | 3/2002 | Rodriguez et al. | |
| 2002/0038226 A1 | 3/2002 | Tyus | |
| 2002/0038320 A1 | 3/2002 | Brook | |
| 2002/0049666 A1 | 4/2002 | Reuter et al. | |
| 2002/0065695 A1 | 5/2002 | Francoeur et al. | |
| 2002/0083034 A1 | 6/2002 | Orbanes et al. | |
| 2002/0091702 A1 | 7/2002 | Mullins | |
| 2002/0116205 A1 | 8/2002 | Ankireddipally et al. | |
| 2002/0143774 A1 | 10/2002 | Vandersluis | |
| 2002/0144101 A1 | 10/2002 | Wang et al. | |
| 2002/0178439 A1 | 11/2002 | Rich et al. | |
| 2002/0188765 A1 | 12/2002 | Fong et al. | |
| 2003/0014421 A1 | 1/2003 | Jung | |
| 2003/0018666 A1 | 1/2003 | Chen et al. | |
| 2003/0027561 A1 | 2/2003 | Iyer | |
| 2003/0046313 A1 | 3/2003 | Leung et al. | |
| 2003/0050931 A1 | 3/2003 | Harman et al. | |
| 2003/0069975 A1 | 4/2003 | Abjanic et al. | |
| 2003/0070158 A1 | 4/2003 | Lucas et al. | |
| 2003/0088593 A1 | 5/2003 | Stickler | |
| 2003/0126151 A1 | 7/2003 | Jung | |
| 2003/0131007 A1 | 7/2003 | Schirmer et al. | |
| 2003/0140045 A1 | 7/2003 | Heninger et al. | |
| 2003/0140308 A1 | 7/2003 | Murthy et al. | |
| 2003/0145047 A1 | 7/2003 | Upton | |
| 2003/0163603 A1 | 8/2003 | Fry et al. | |
| 2003/0167266 A1 | 9/2003 | Saldanha et al. | |
| 2003/0167445 A1 | 9/2003 | Su et al. | |
| 2003/0177118 A1 | 9/2003 | Moon et al. | |
| 2003/0177341 A1 | 9/2003 | Devillers | |
| 2003/0191849 A1 | 10/2003 | Leong et al. | |
| 2003/0217033 A1 | 11/2003 | Sandler et al. | |
| 2003/0217083 A1 | 11/2003 | Taylor | |
| 2004/0122872 A1 | 6/2004 | Pandya et al. | |
| 2005/0027658 A1 | 2/2005 | Moore et al. | |
| 2005/0060345 A1 | 3/2005 | Doddington | |
| 2005/0065987 A1 | 3/2005 | Telknowski et al. | |

FOREIGN PATENT DOCUMENTS

| | | |
|---|---|---|
| WO | WO 96/34350 | 10/1996 |
| WO | WO 02/46980 | 6/2002 |

OTHER PUBLICATIONS

Hellerstein, A Generalized Search Tree for Database Systems, Jan. 19, 1996.

Deng et al., A Probabilistic Approach to fault Diagnosis in Linear Lighwaves Network, Department of Electrical Engineering, May 1992, pp. 1-122.

Sammet, Beginning of 4.6 Software Evaluation, Tests and Measurements and RMF I/O Time Validation, Association of Computing Machinery, p. 519.

Xu, ERDraw: An XML-based ER-diagram Drawing and Translation Tool.

Vanbommel, Genetic Algorithms for Optimal Logical Database Design Information and Software Technology, vol. 36, No. 12, p. 725-732, 1994.

Strom et al., Gryphon: An Information Flow Based Approach to Message Brokering, International Symposium on software Reliability, Jun. 20, 2005.

Hilbert, Hilbert, et al., An Approach to Large Scale Collection of Application Usage Data Over the Internet, Software Engineering 1998, Proceedings of the 1998 International Conference, Abstract, Apr. 1998.

Chen et al., Improving Index Performance through Prefetching School of Computer Science Carnegie Mellon University, Dec. 2000.

Van Steen et al., Model for Worldwide Tracking of Distributed Objects, Vrije Universiteit, Amsterdam.

Quantitative Monitoring of Software Development by Time-Based and Intercheckpoint Monitoring, Software Engineering Journal, vol. 5, Iss. 1, p. 43-49, Abstract, Jan. 1990.

Moser, Transactions in a Distributed Object Environment, Department of Electrical and Computer Engineering, Jun. 19, 2005.

Ramakrishnan, Tree-Structured Indexes Module 2, Lectures 3 and 4.

* cited by examiner

APPLICATION ACCESS CONTROL SYSTEM

FIELD OF THE INVENTION

The present invention relates to a security sub-system in a computer system of an institution which controls a user's access rights to an application via a configured mechanism whenever a user accesses the application and thus ensures that the application is accessed by an authorized user.

BACKGROUND OF THE INVENTION

In a large institution, there are hundreds of applications such as databases created, shared, and accessed by users from different departments of the institution on a daily basis. How to ensure safety of these documents, that is. to ensure that each user is limited to only necessary and sufficient access to the institution's information to perform his/her business role effectively, presents a challenge.

Currently, Microsoft Office Suite products. such as Word, Excel, Power Point, Access. and Visio, have no systematic way to externally authenticate users. This leaves a large security gap within the institution. In addition, although Microsoft Office Suite products have limited security options that require every user to use a password to open the file. .lack of the effective management of these passwords and avoidance of password sharing poses some serious security risks.

Therefore, there is a need to design a centralized and scalable mechanism to secure these applications so that they are accessed by authorized users.

SUMMARY OF THE INVENTION

This invention is generally directed to a system and a method for an internal user's obtaining authorization of accessing some applications such as databases in the forms of Microsoft Excel or Access spreadsheets maintained in an institution's computer system, via creating a randomly-generated and encrypted password with a configured mechanism by the application access control server, so that unauthorized access of the applications is restricted, their proper usage is controlled, and thus safety of the applications is ensured. A user, therefore. can use the existing user account to access the protected application without new passwords.

As an internal user, his/her rights to access appropriate levels and parts of information stored or existing in an institution's computer system based on the user's functional roles with the institution are assigned via the institution's request and approval process with periodic re-certification procedures. When the user wants to access some applications, he/she cannot access the applications directly because he/she does not have the passwords to these applications. He/she will first log into an application launcher with his/her single sign-on ID and password (SSO). which is used to login many systems for general purpose. The launcher will check the user's SSO against the application's entitled user list to decide whether he/she is authorized to use this application. If yes, the system will retrieve the random-generated password from a secure store in a configured mechanism and use it to help the user to launch the application. If not. the user is declined to access the application. This random password will not disclose to the user.

The invention provides additional protection of the applications. If someone stole the applications or sent them to someone outside the institution via an email, the recipient cannot open them because both sides do not know the real passwords of the applications.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIG. 3 is a diagram illustrating how to join all application administrators to a privilege group called "EAST-UDT-ADMINISTRATOR" in accordance with one embodiment of the present invention.

FIG. 5 is a diagram illustrating how to upload a namespace of an application by an application administrator in accordance with one embodiment of the present invention.

DETAILED DESCRIPTION OF THE INVENTION

Figure 1:
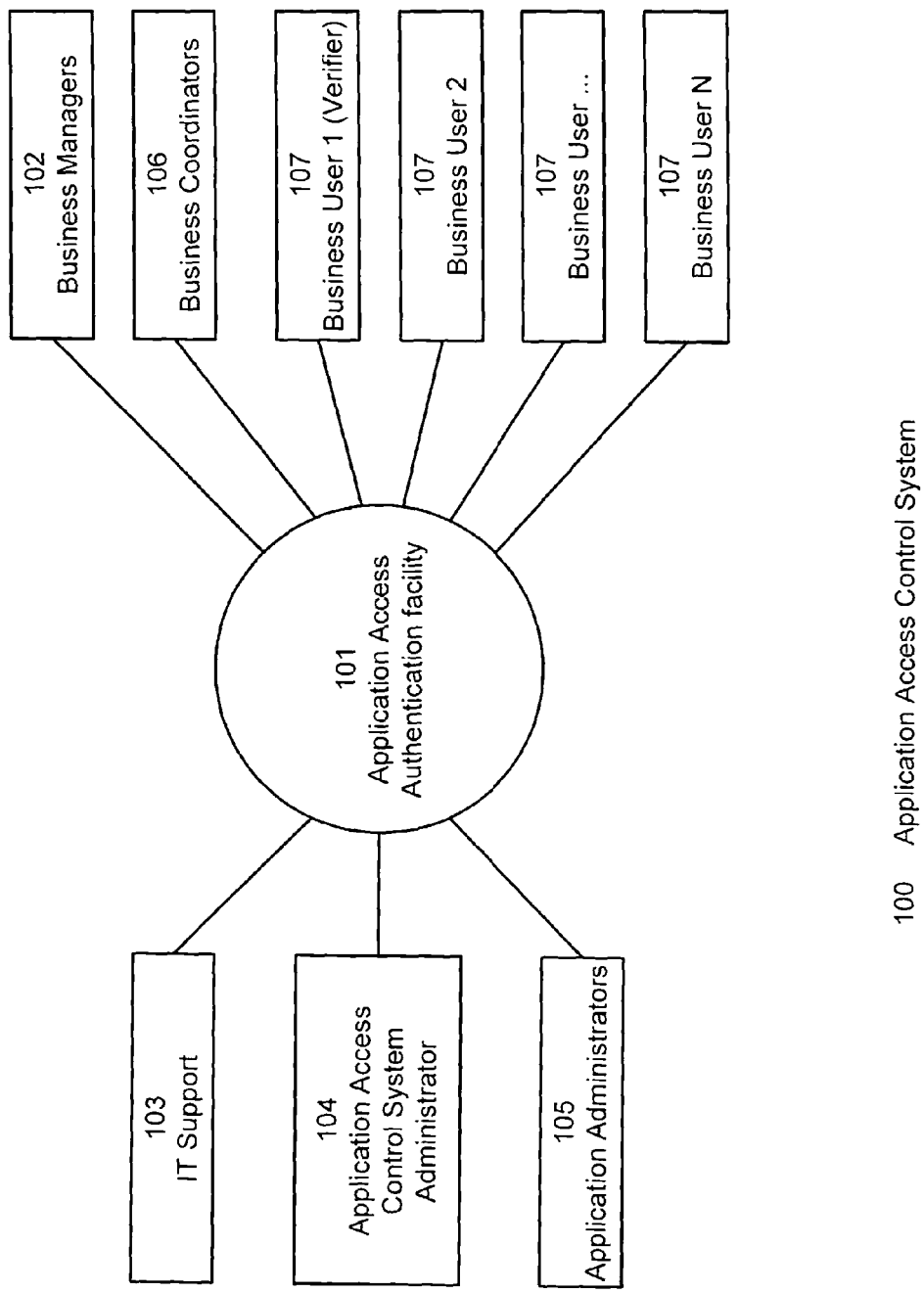
FIG. 1 is a block diagram illustrating an Application Access Control System in accordance with one embodiment of the present invention.
Figure 2:
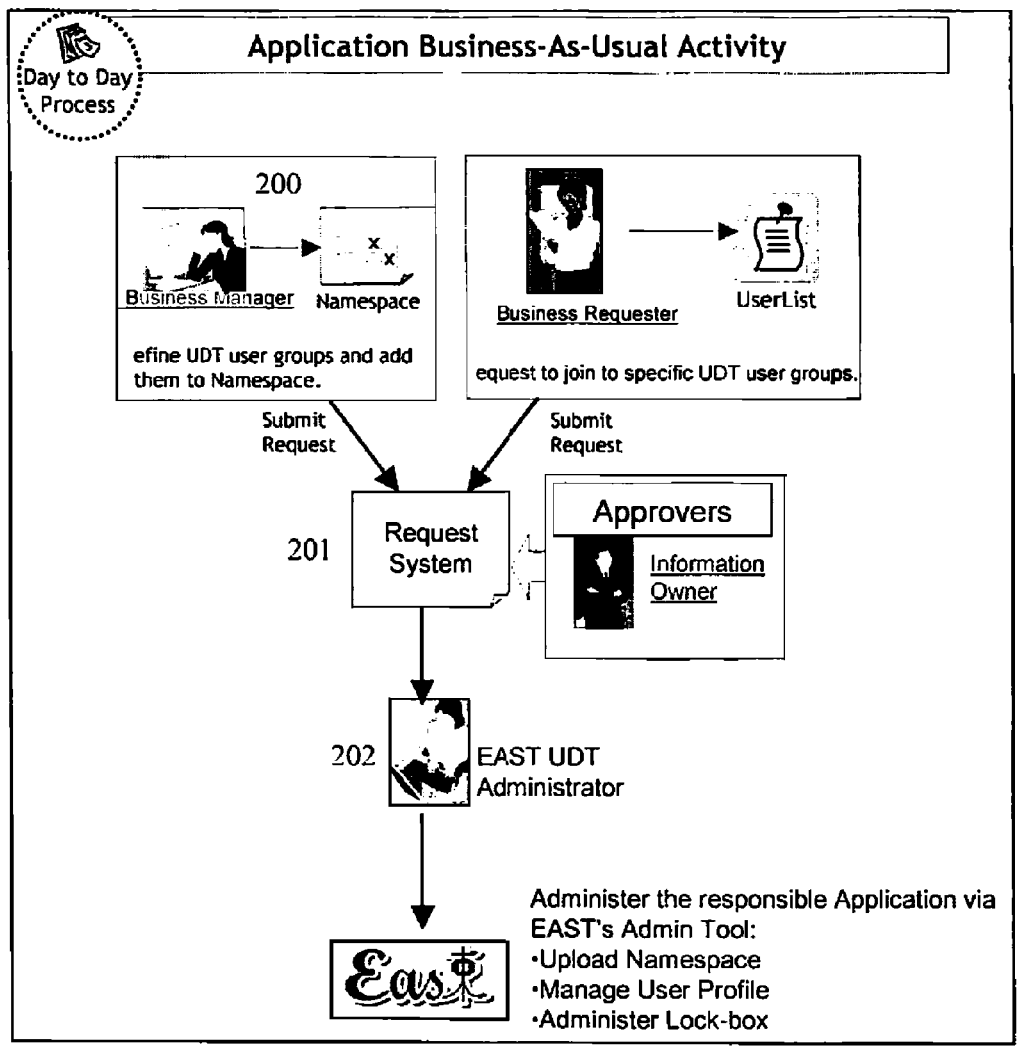
FIG. 2 is a diagram illustrating part of a day-to-day application access certification process in accordance with one embodiment of the present invention.
Figure 3:
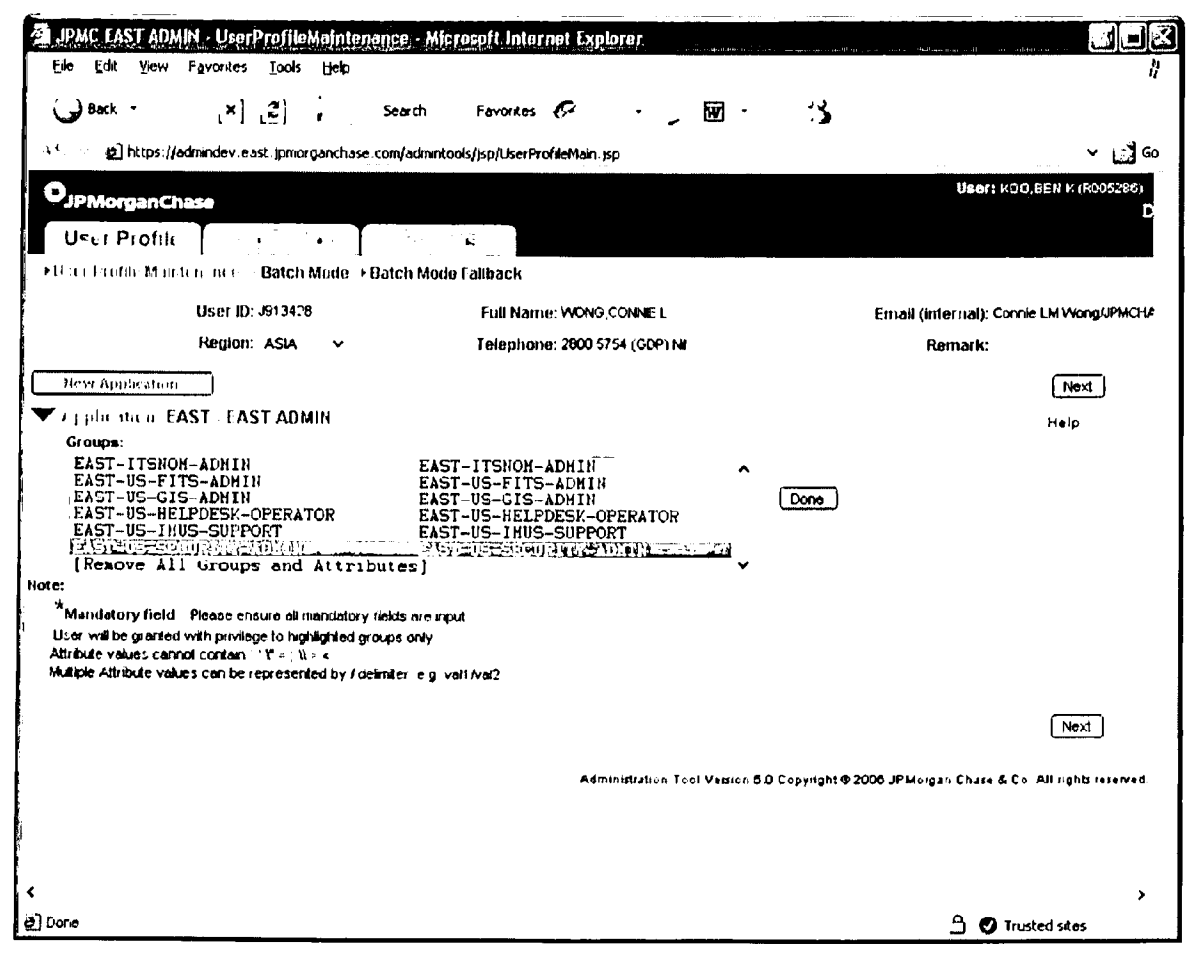
Figure 4:
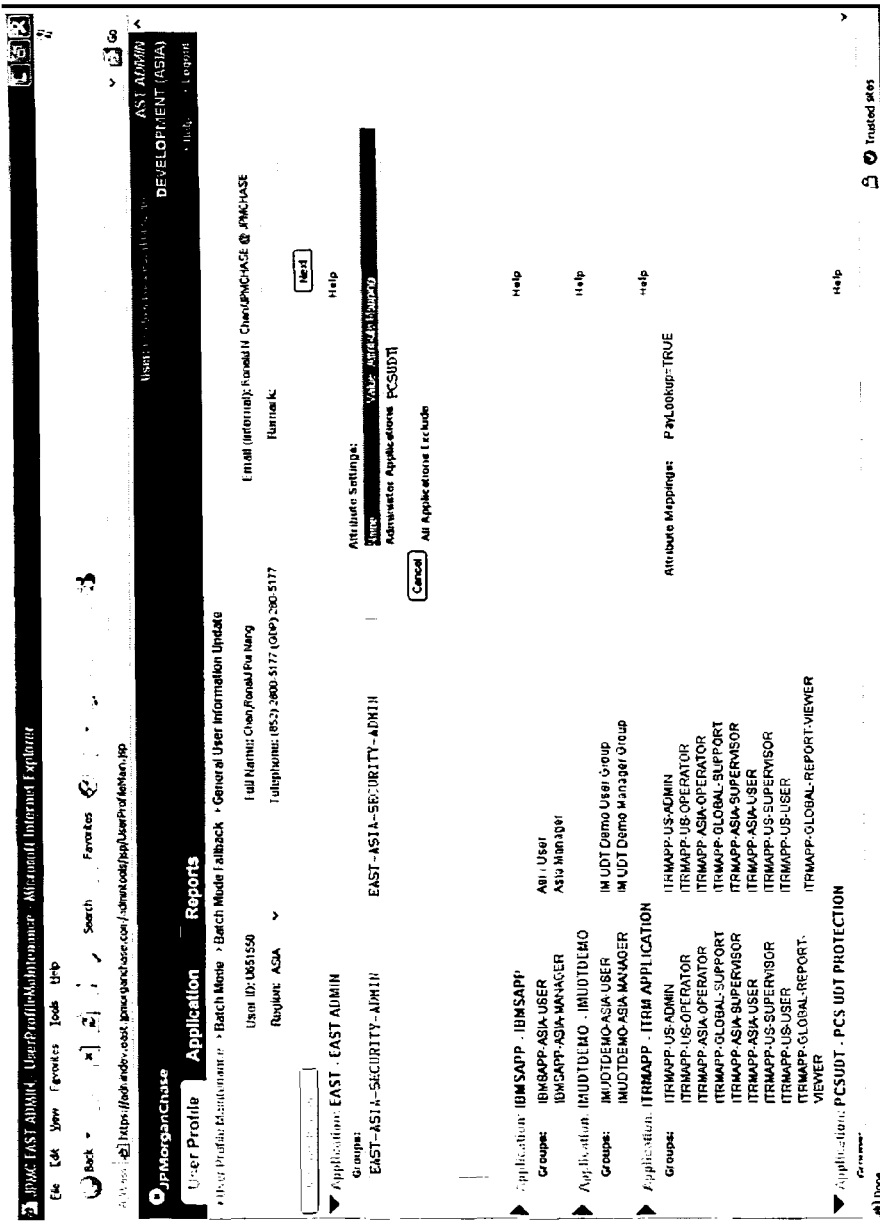
FIG. 4 is a diagram illustrating how to delegate administration of an application to an application administrator in accordance with one embodiment of the present invention.
Figure 5:
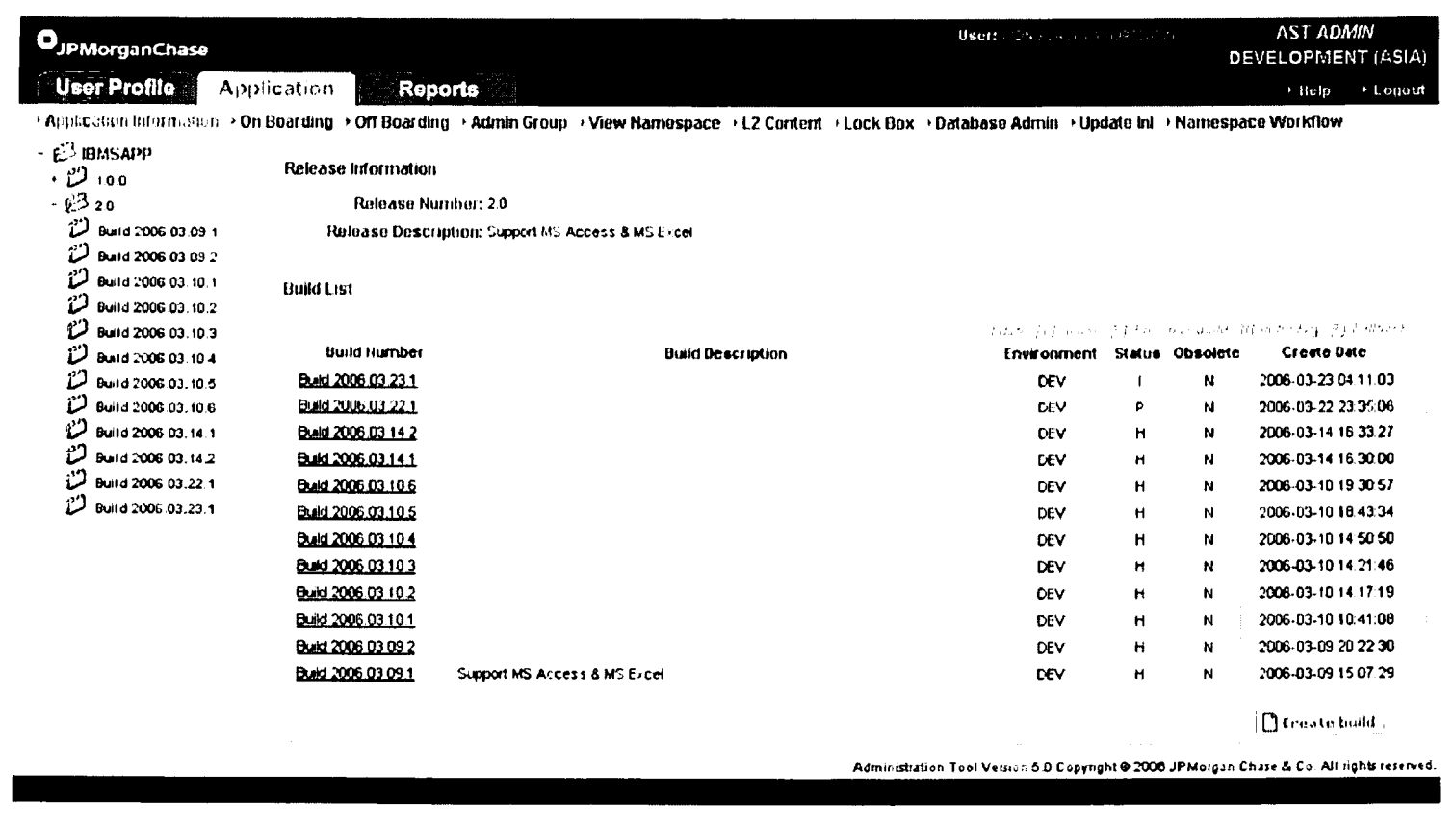
Figure 6:
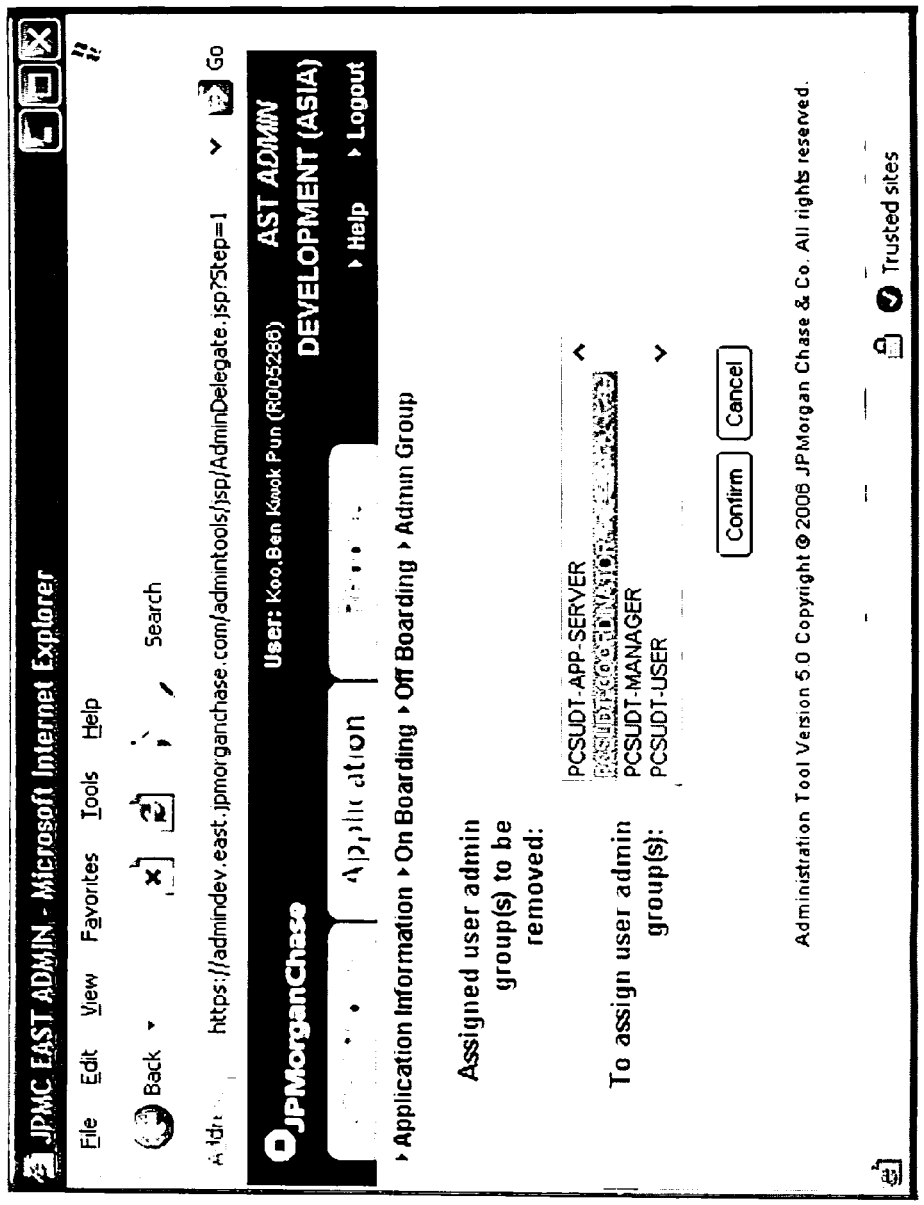
FIG. 6 is a diagram illustrating how to assign a coordinator group as a user administration group in accordance with one embodiment of the present invention.
Figure 7:
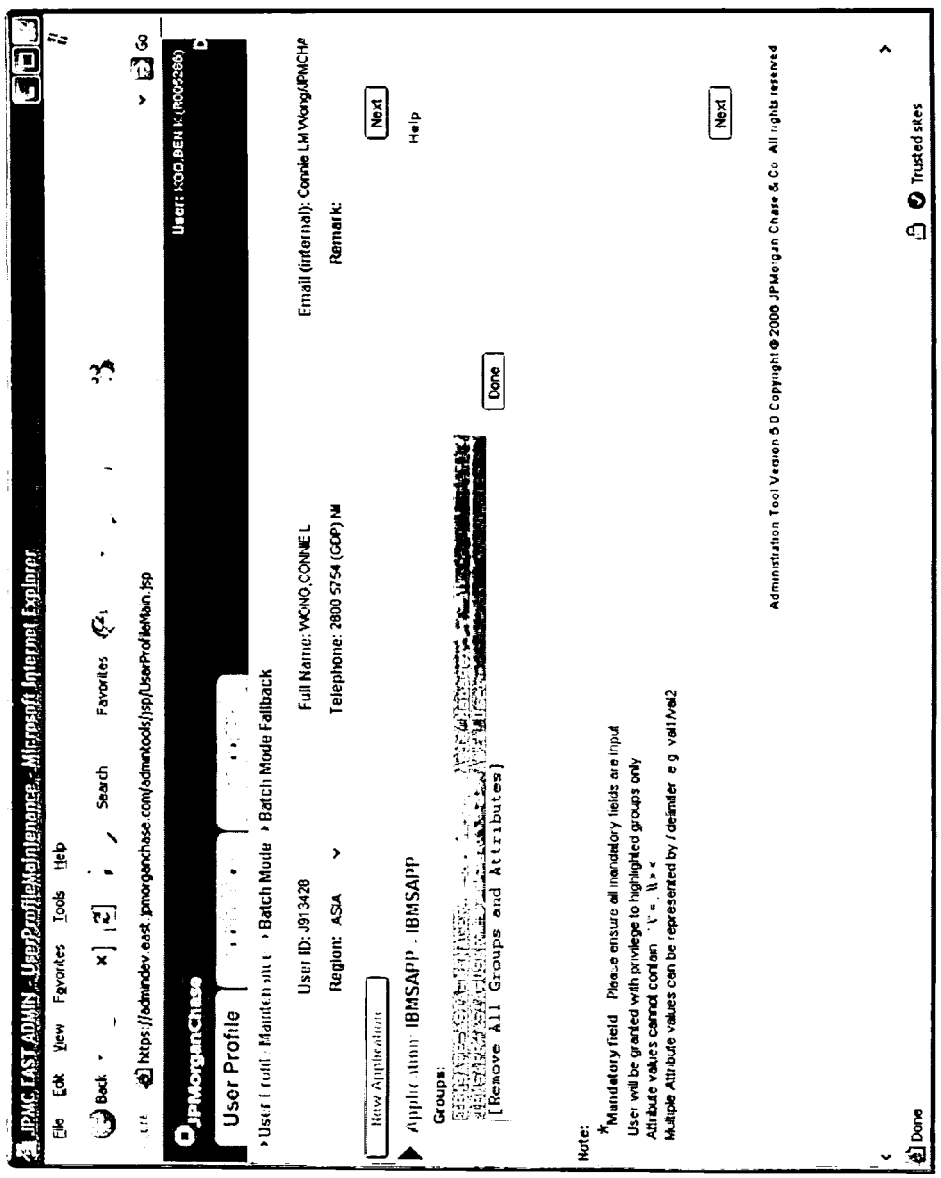
FIG. 7 is a diagram illustrating how to join business coordinators to a coordinator group in accordance with one embodiment of the present invention.
Figure 8:
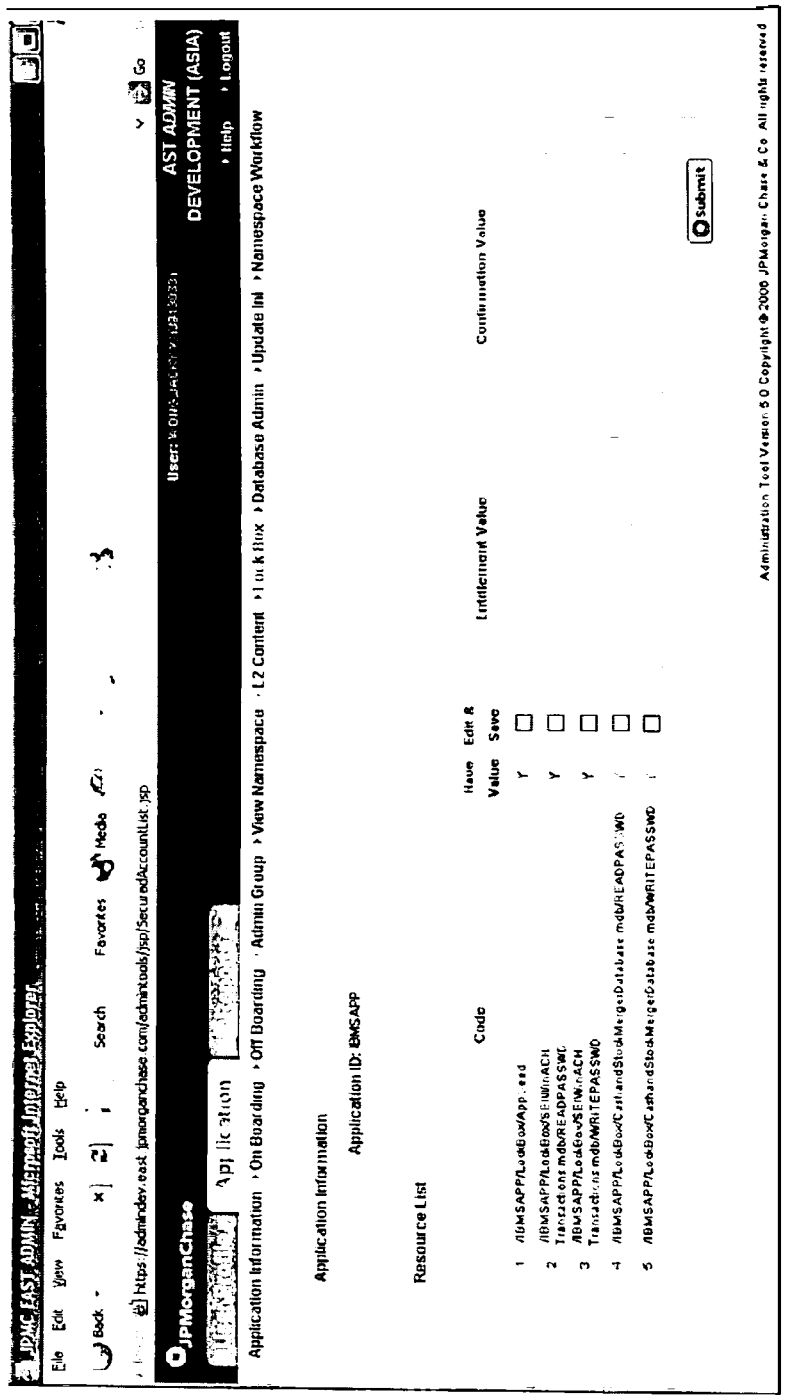
FIG. 8 is a diagram illustrating how to set up two lockbox values in accordance with one embodiment of the present invention.

FIG. 1 is a block diagram illustrating an Application Access Control System (hereafter also called "EAST") 100 in accordance with one embodiment of the present invention. FIG. 2 is a diagram illustrating part of a day-to-day application access administration process in accordance with one embodiment of the present invention. FIG. 3 is a diagram illustrating how to join all application administrators to a privilege group called "EAST-UDT-ADMINISTRATOR" in accordance with one embodiment of the present invention. FIG. 4 is a diagram illustrating how to delegate administration of an application to an application administrator in accordance with one embodiment of the present invention. FIG. 5 is a diagram illustrating how to upload a namespace (access control matrix) of an application by an application administrator in accordance with one embodiment of the present invention. FIG. 6 is a diagram illustrating how to assign a coordinator group as a user administration group in accordance with one embodiment of the present invention. FIG. 7 is a diagram illustrating how to join business coordinators to a coordinator group in accordance with one embodiment of the present invention. FIG. 8 is a diagram illustrating how to set up two lockbox values in accordance with one embodiment of the present invention. FIG. 1 is described in connection with FIGS. 2-8 in order to set forth description of the system in a concrete fashion easily understood by the person of ordinary skills.

As set forth in FIG. 1, the Application Access Control System comprises an application access authentication facility 101, business managers 102, a computer system (IT) support 103, an application access control system administrator 104, application administrators 105, business coordinators 106, and business users 107. The application access authentication facility is an engine which controls the application access authentication process. The business managers are persons who submit requests for on-boarding new applications (also 200 as shown in FIG. 2). The requests include information such as the applications' owners. user groups, users in each group, business coordinators, and application administrators. The IT support is an IT staff who assigns identification numbers (IDs) to the requested new applications, loads the applications to the application access control server. prepares a namespace (access control matrix) for a user developed tool (UDT) which is a functional carrier of the requested application(s) group with information such as the user groups and the users in each group which the business manager submitted and got approved by the information owners (also 201 as shown in FIG. 2), and submits requests to the institution's system for creating new records for the requested applications in the Emergency ID Request System (EIDRS). The application access control system administrator is a person who, via a software program called "EAST Admin Tool", joins all nominated application administrators (also referred to the "EAST UDT Administrator") to a privilege group called "EAST-UDT-ADMINISTRATOR" (as shown in FIG. 3). and delegates administration of the applications to each of these nominated application administrators and business coordinators (as shown in FIG. 4). The application administrators are persons who upload the namespaces (access control matrices) for the user developed tools (UDTs) (as shown in FIG. 5), assign "APPID-COORDINATOR" group as a user administration group (as shown in FIG. 6), join all nominated business coordinators to a privilege group called "APPID-COORDINATOR" (as shown in FIG. 7). obtain application seed value from the IT support and set it to a lockbox called "AppSeed" (as shown in FIG. 8), set a random value to a lockbox called "BREAKGLASSPWD" and the corresponding EIDRS record of the applications, and assign business users to the user groups (also 202 as shown in FIG. 2). The business coordinators are nominated end-users who are responsible to manage the security control of UDTs for their own business group. They. via a software program called "EAST UDT Security Toolkit", register the UDTs and assign user group access to these UDT, and create a break glass record corresponding to each installed UDT to the break glass database which is placed in an appropriate location in the shared drive. The break-glass database is a database that is housed local to the protected application that holds the encrypted password to the application. It can be decrypted by use of a software program "Break Glass Tool" and a break-glass password. This is used in case of an emergency when the user would be able to "Break Glass" and unlock the application if the network is down to authenticate user credentials or the Application Access Control system is unavailable. The business users are application users who can also help to verify the setup of the UDT protection.

It should be understood that the business coordinator is an ordinary end-user who is selected to take care of the control of these UDTs. No technical background is required. He/she can use an user-friendly security toolkit to register these UDTs and pick the authorized user group from the list.

It should also be understood that the UDTs are grouped by lines of business. In each line of business, the UDTs can be further sub-grouped by different departments or different information owners. Each of the UDT groups is registered under an application with a separated application record.

Figure 9:
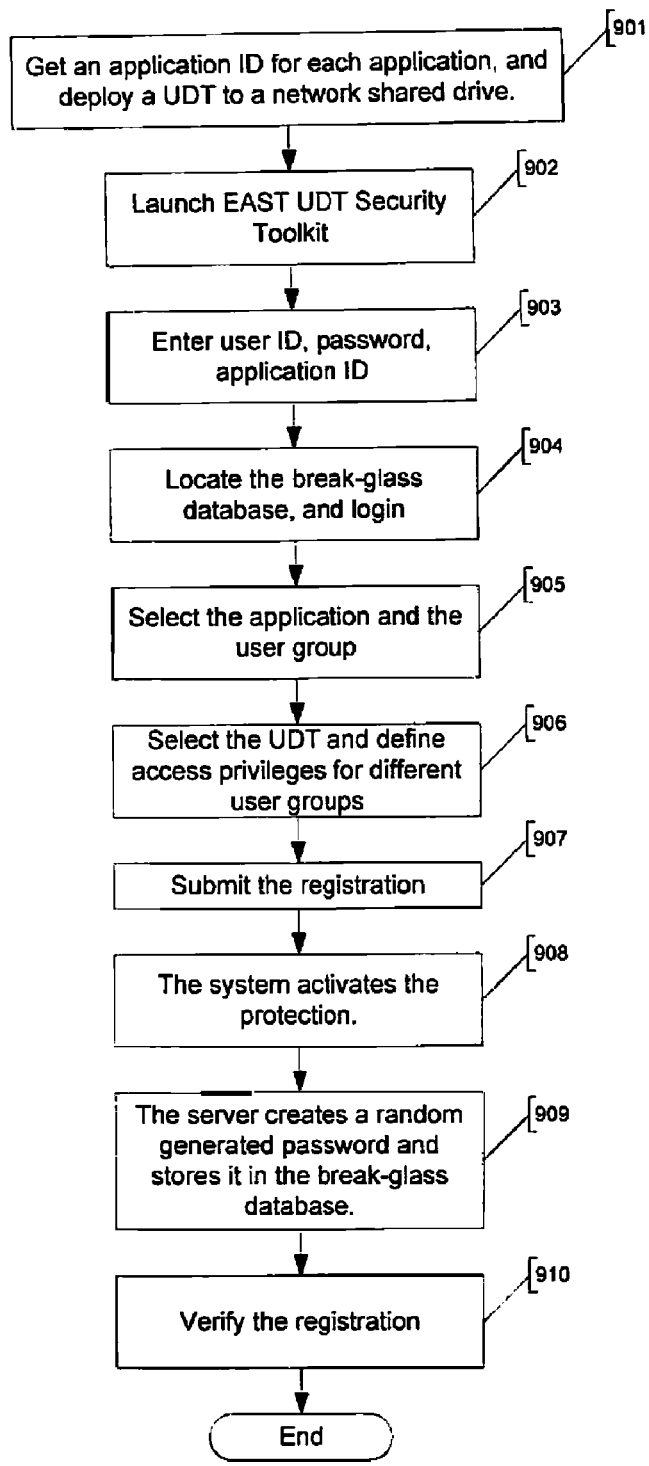
FIG. 9 is a flowchart showing how to register a secured user developed tool (UDT) in accordance with one embodiment of the present invention.
Figure 10:
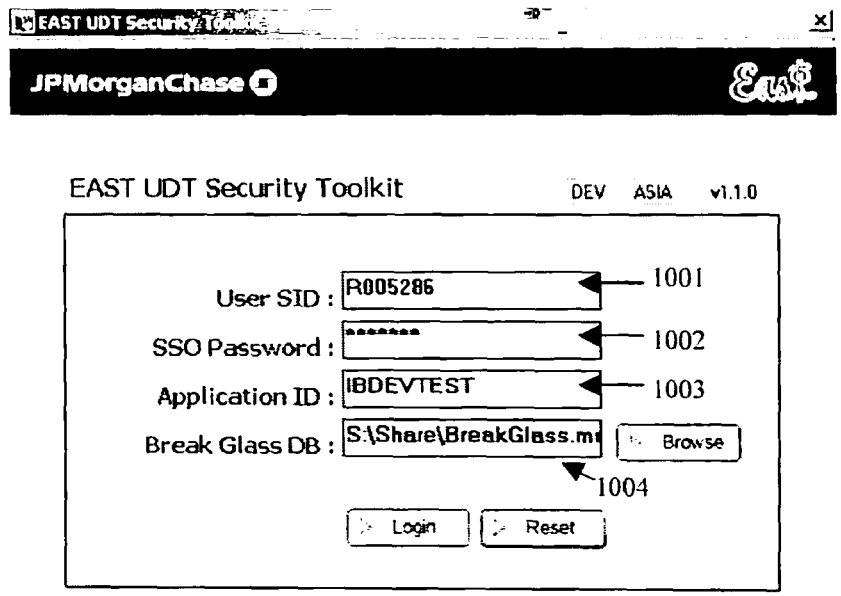
FIG. 10 is a diagram illustrating how to login the EAST UDT Security Toolkit in accordance with one embodiment of the present invention.
Figure 11:
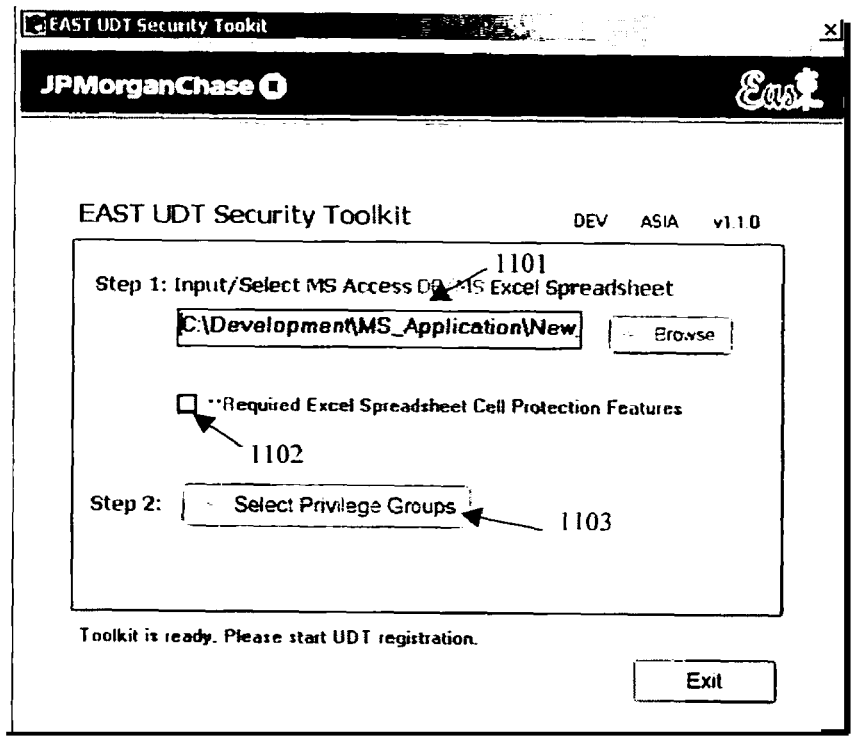
FIG. 11 is a diagram illustrating the continued steps during login the EAST UDT Security Toolkit in accordance with one embodiment of the present invention.
Figure 12:
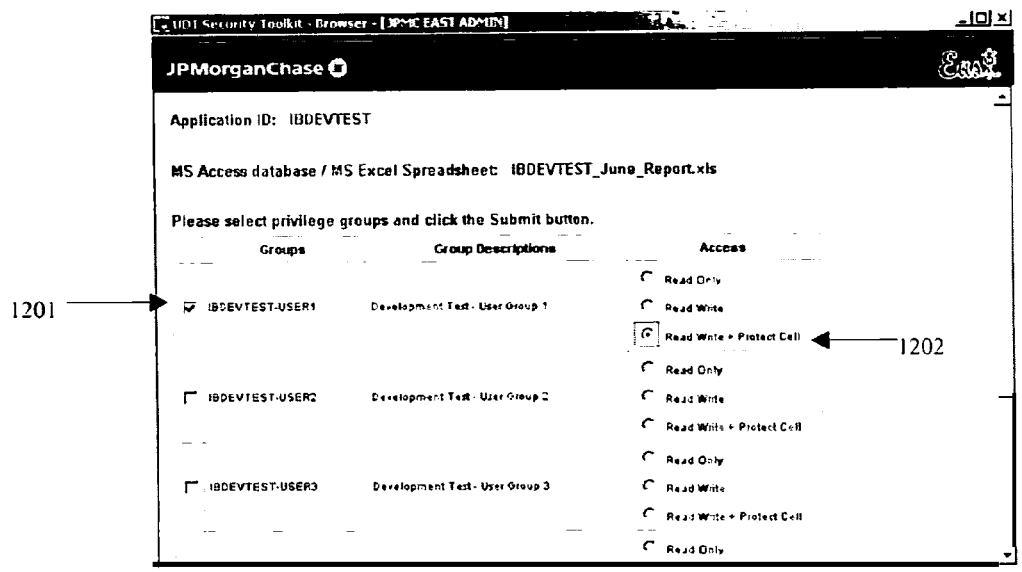
FIG. 12 is a diagram illustrating how to select access levels for MS Excel UDT in accordance with one embodiment of the present invention.
Figure 13:
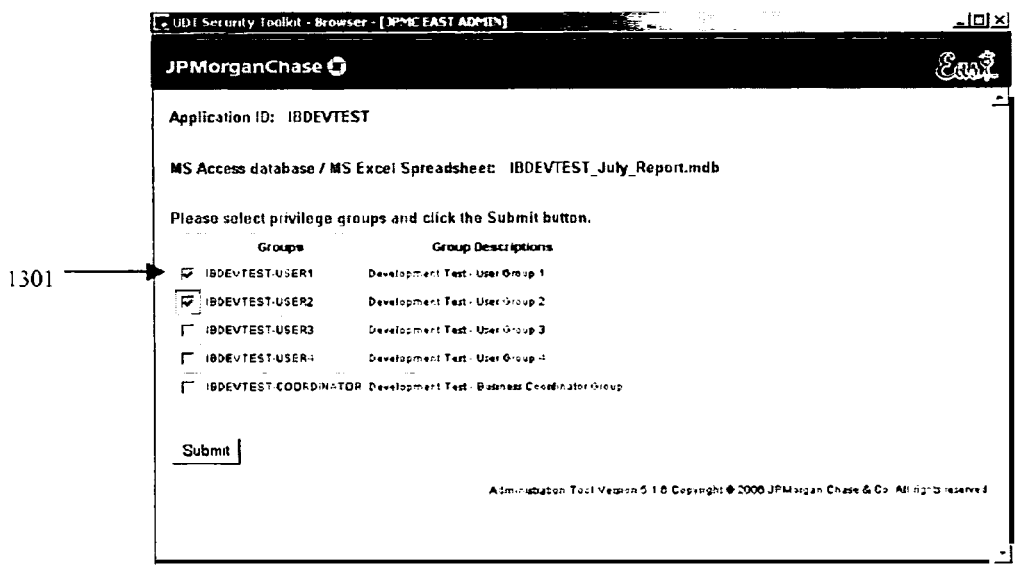
FIG. 13 is a diagram illustrating how to select access levels for MS Access UDT in accordance with one embodiment of the present invention.

To access some applications protected by the Application Access Control System, it is required to register with the system first by a business coordinator via a software program called "EAST UDT Security Toolkit" so that a UDT containing the applications is protected. FIG. 9 is a flowchart showing how to register a UDT in accordance with one embodiment of the present invention. FIG. 10 is a diagram illustrating how to login the EAST UDT Security Toolkit in accordance with one embodiment of the present invention. FIG. 11 is a diagram illustrating the continued steps after login the EAST UDT Security Toolkit to pick a UDT for registration, in accordance with one embodiment of the present invention. FIG. 12 is a diagram illustrating how to select access levels for a MS Excel UDT in accordance with one embodiment of the present invention. FIG. 13 is a diagram illustrating how to select access levels for MS Access UDT in accordance with one embodiment of the present invention. The process of FIG. 9 is described in connection with FIGS. 10-13 in order to set forth the process in a concrete fashion easily understood by the person of ordinary skills. However, this articulation of the process is exemplary only, and the process could be implemented different from those of FIGS. 10-13.

As set forth in FIG. 9, before registration. the business coordinator needs to get an application ID for each access-required application and deploy a UDT to a protected network shared drive 901. He double clicks the icon of EAST UDT Security Toolkit 902. After launching the EAST UDT Security Toolkit, he enters his user ID. his single sign-on password which is a password used to log into the computer system for general purpose, the application ID (e.g. PCSUDT) 903 (also 1001, 1002, and 1003 respectively as shown in FIG. 10). Then he locates the break-glass database housing the encrypted passwords for the UDT to be registered 904 (also 1004 as shown in FIG. 10). After successful login, he selects the access-required application and the user group he belongs to 905 (also 1101 and 1102 respectively as shown in FIG. 11). He then selects the UDT from a network shared drive and defines access privileges (Read/Write) for different user groups 906. For MS Excel UDT, the business coordinator can select different user groups who are allowed to use the spreadsheet with "Read Only" or "Read Write" option (as shown in FIG. 12). For MS Access UDT, the business coordinator can select different user groups who are allowed to use this spreadsheet with "Read Write" option (as shown in FIG. 13). The available privileges options (e.g. "Read Only" and "Read Write") locked or granted by the UDT are based on the application being protected. After the "Submit" button is pressed, if the protection has been set successfully, a message box "Set Password Successfully" appears 907. The business coordinator then presses OK to close the Toolkit. It may take the system a few minutes to activate the protection 908. During this period, the application access control server creates and encrypts a random generated password for the access-required application, and stores the password in its back-end centralized database as well as the local break-glass database corresponding to the registered UDT and thus protects the UDT and the application 909. After the business coordinator registers a UDT. he/she should work with a business user who is entitled to use this UDT to verify the break-glass database setup and the protection setup to that UDT 910.

Figure 14A:
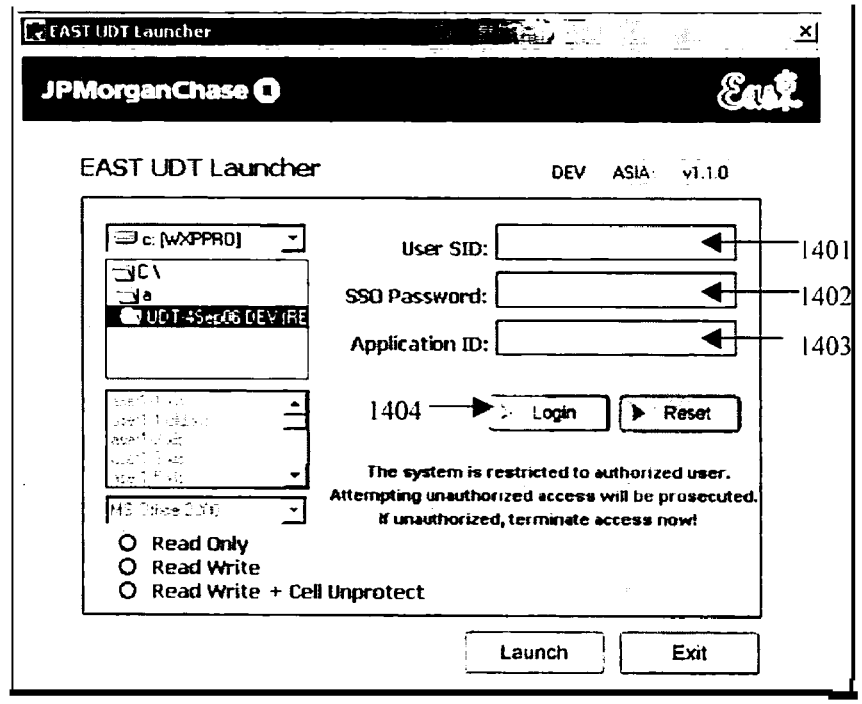
FIGS. 14A-B are diagrams illustrating how to access a protected application via the EAST UDT launcher in accordance with one embodiment of the present invention.
Figure 14B:
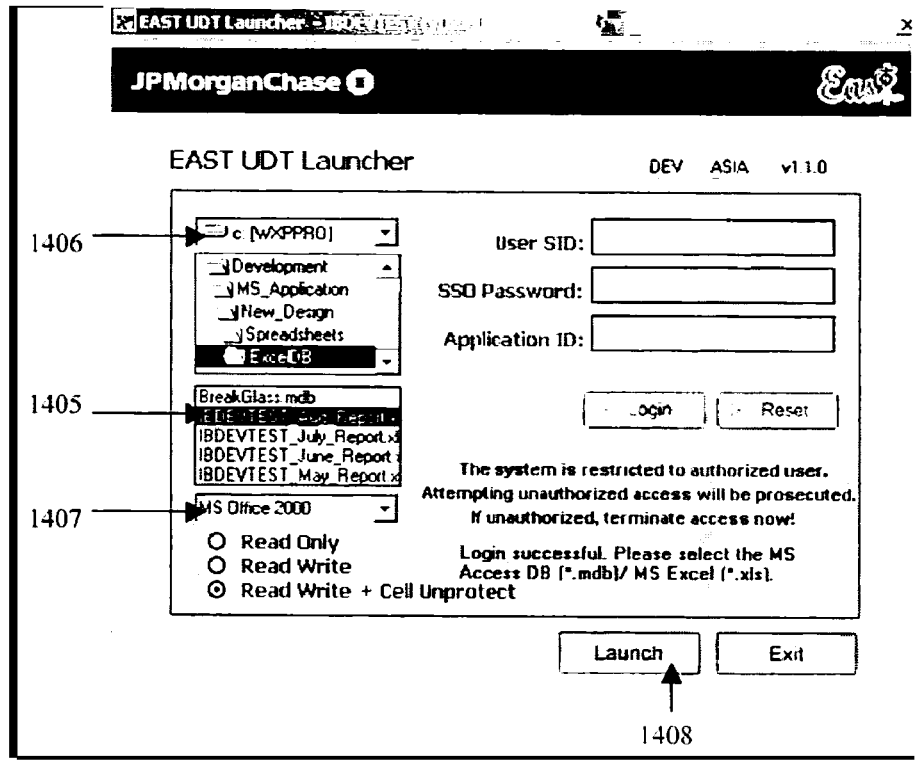

Once a registration of a UDT containing an access-required application is carried out by a business coordinator. an entitled business user can access the UDT and the application. FIGS. 14A-B are diagrams illustrating how to access a protected application via a EAST UDT launcher which is a software program used to access the protected application in accordance with one embodiment of the present invention. The business user first double clicks the icon of the EAST UDT Launcher. As set forth in FIG. 14A, after the EAST UDT Launcher opens, he/she enters his user ID 1401, his single sign-on password 1402, the access-required application ID (e.g., PCSUDT) 1403, and press "Login" button 1404. After verified the password by the application authentication facility, The application access control server will check with its record whether the user is authorized to access the requested application. If yes. as set forth in FIG. 14B. the option box in bottom left corner will be enabled 1405. The user can select the access-required UDT 1406 and its corresponding break-glass database 1405 for launching the application. For Excel UDT, the user can select "Read Only" or "Read Write" option 1407. For Access UDT. the user can select "Read Write Option". Finally, the user press "Launch" button to open that UDT 1408. The system then requests the encrypted password from the application access control server and uses the encrypted password to launch the protected application.

Figure 15:
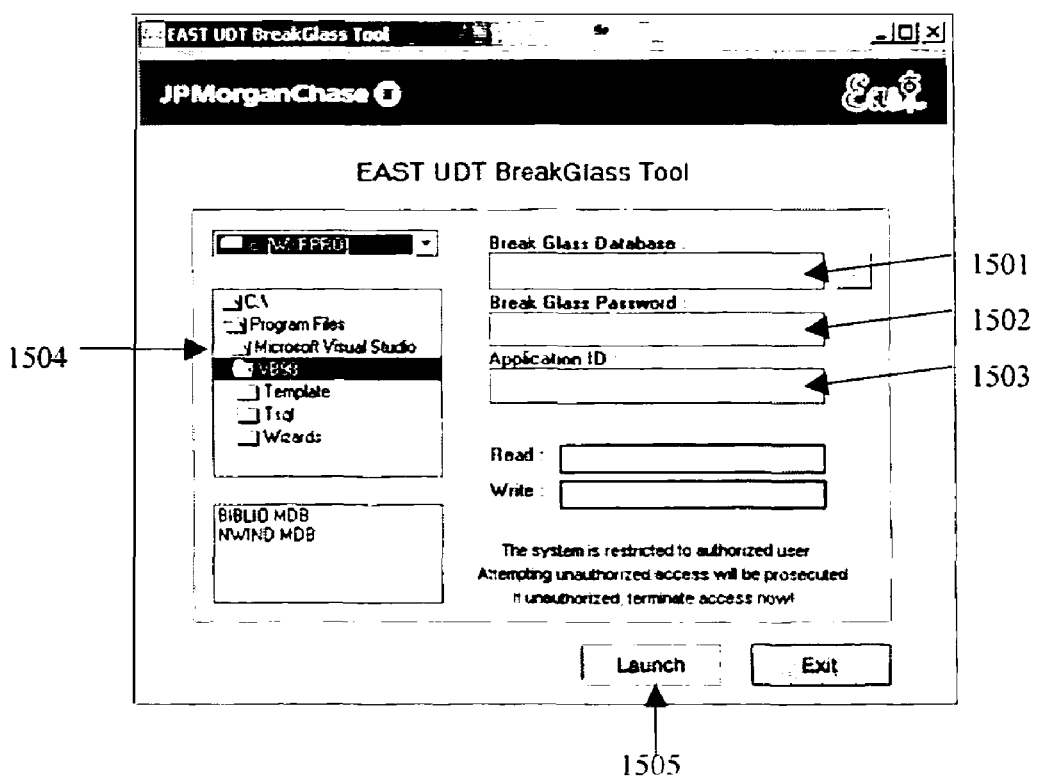
FIG. 15 is a diagram illustrating how to use the EAST UDT Break-Glass Tool to launch an application under an emergency in accordance with one embodiment of the present invention.

For an emergency, e.g. when the application access authentication facility is un-reachable and the user logins cannot be validated, an authorized user can use a software program called EAST UDT Break-Glass Tool to retrieve the clear-text password for a particular UDT. He/she can then open the required application directly with this clear-text password instead of using the EAST UDT Launcher. Under such circumstances, after the break-glass period is over, a new random password will be generated by the server and placed under the break-glass database. The prerequisites for the user who can carry out this process are that he/she can access the break-glass database in the shared drive, and he/she is authorized to retrieve the break-glass password from EIDRS. FIG. 15 is a diagram illustrating how to use the EAST UDT Break-Glass Tool to launch an application under an emergency in accordance with one embodiment of the present invention. The authorized user first starts the EAST UDT Break-glass Tool. He/she then selects the pre-set break-glass database from the shared drive 1501, enters the break-glass password which he obtained from the EIDRS earlier 1502, enters the application ID 1503, selects an UDT tool for break-glass 1504, and finally clicks "Login" 1505. The clear-text password will be shown. Then, he/she can use this password to launch the application.

Although an illustrative embodiment of the present invention, and various modification thereof, have been described in detail herein with reference to the accompanying figures, it is to be understood that the invention is not limited to this precise embodiment and the described modifications, and that various changes and further modifications may be effected therein by one skilled in the art without departing from the scope or spirit of the invention as defined in the claims.

The invention claimed is:

1. A method for controlling a user's access rights to protected and access-required application in a computer system, comprising:
    (a) registering a user developed tool housing the protected and access-required application with the computer system to activate protection on the user developed tool and the protected and access-required application housed within the user developed tool via a software program;
    (b) creating a randomly-generated and encrypted password in a configured mechanism for the protected and access-required application, and storing the randomly-generated and encrypted password in a break-glass database and a back-end database corresponding to the registered user developed tool by an application access control server;
    (c) entering user's identification, a single sign-on password, and identification of the protected and access-required application in a user developed tool launcher, to login with a centralized application access authentication facility;
    (d) checking whether the user is authorized to access the protected and access-required application by the application access control server;
    (e) retrieving the randomly-generated and encrypted password from the back-end database and decrypting the randomly-generated and encrypted password to use the decrypted randomly-generated password to launch the protected and access-required application by the application access control server if confirmed that the user is authorized to access the protected and access-required application; and
    (f) retrieving clear-text password for a particular application in the user developed tool by an authorized user, and launching the protected and access-required application, via the software program, when an emergency occurs so that the computer system is unable to authenticate user credentials.

2. The method of claim 1, wherein the emergency comprises that the application access authentication facility is unreachable and that user logins cannot be validated or the application access control server is not functioning.

3. The method of claim 1, further comprising:
    (g) verifying whether the user developed tool is properly registered and thus protected.

4. The method of claim 1, wherein the protected and access-required application comprises databases, software, documents, or presentation materials.

5. The method of claim 1, wherein the user developed tool is a functional carrier of the protected and access-required application grouped in a network shared drive, and grouped by lines of business, departments, or application owners.

6. The method of claim 1, wherein the break glass database is a database containing the randomly-generated and encrypted passwords corresponding to the protected and access-required applications in the user developed tool, and is housed local to the user developed tool.

7. The method of claim 1, wherein the single sign-on password is a centralized managed password used for logging into the computer system for general purpose.

8. The method of claim 1, wherein the centralized application access authentication facility comprises an engine controlling and implementing an access authentication process.

9. A method for controlling a user's access rights to protected and access-required application in a computer system, comprising:
   (a) registering a user developed tool housing the protected and access-required application with the computer system to activate protection on the user developed tool and the protected and access-required application housed within the user developed tool via a software program;
   (b) creating a randomly-generated and encrypted password in a configured mechanism for the protected and access-required application, and storing the randomly-generated and encrypted password in a break-glass database and a back-end database corresponding to the registered user developed tool by an application access control server;
   (c) entering user's identification, a single sign-on password, and identification of the protected and access-required application in a user developed tool launcher, to login with a centralized application access authentication facility;
   (d) checking whether the user is authorized to access the protected and access-required application by the application access control server;
   (e) retrieving the randomly-generated and encrypted password from the back-end database and decrypting the randomly-generated and encrypted password to use the decrypted randomly-generated password to launch the protected and access-required application by the application access control server if confirmed that the user is authorized to access the protected and access-required application;
   (f) submitting requests for on-boarding new applications, including information comprising applications' owners, user groups, users in each user group, business coordinators, and application administrators, by business managers;
   (g) assigning identification numbers to the requested new applications, on-boarding the requested new applications to the application access control server, preparing namespaces (access control matrices) for the user developed tools with information about the user groups and the users, and submitting requests to the computer system for creating emergency records for the requested new applications, by a computer system support;
   (h) joining all nominated application administrators to a designated privilege group, and delegating administration of the requested new applications to each of the nominated application administrators and business coordinators, via a designated software program, by an application access control system administrator; and
   (i) uploading the namespaces (access control matrices) for the user developed tool, joining all the nominated business coordinators to the designated privilege group, assigning the designated privilege group as a user administration group, obtaining application seed value from the computer system support and setting the application seed value to a lockbox, setting a random value to a second lockbox and the corresponding emergency record of the requested new applications, and assigning business users to the user groups, by application administrators.

10. The method of claim 9, wherein the business coordinators are nominated end-users responsible for managing security control of the user developed tool for their own business group, registering the user developed tool, assigning user group access to the registered user developed tool, and placing the break glass database corresponding to each installed user develop tool to an appropriate location in a shared drive.

11. A method for controlling a user's access rights to protected and access-required application in a computer system, comprising:
   (a) registering a user developed tool housing the protected and access-required application with the computer system to activate protection on the user developed tool and the protected and access-required application housed within the user developed tool via a software program;
   (b) creating a randomly-generated and encrypted password in a configured mechanism for the protected and access-required application, and storing the randomly-generated and encrypted password in a break-glass database and a back-end database corresponding to the registered user developed tool by an application access control server;
   (c) entering user's identification, a single sign-on password, and identification of the protected and access-required application in a user developed tool launcher, to login with a centralized application access authentication facility;
   (d) checking whether the user is authorized to access the protected and access-required application by the application access control server; and
   (e) retrieving the randomly-generated and encrypted password from the back-end database and decrypting the randomly-generated and encrypted password to use the decrypted randomly-generated password to launch the protected and access-required application by the application access control server if confirmed that the user is authorized to access the protected and access-required application;
   wherein registering a user developed tool comprises:
   (a) launching the software program for registering a user developed tool;
   (b) entering the user identification and the single sign-on password of a person who can register a user developed tool, and the application identification in the corresponding fields of the registration program;
   (c) locating the break-glass database housing the randomly-generated and encrypted passwords for the user developed tool in corresponding field of the registration program;
   (d) logging in the registration program;
   (e) selecting the protected and access-required application and the user group;
   (f) selecting the user developed tool from a network shared drive; and
   (g) submitting the registration.

12. A computer security system for controlling a user's access rights to protected applications in a computer system whenever the user accesses the protected applications and thus ensuring that the protected applications are accessed by authorized users, comprising:
   (a) a computer server, comprising processor and memory, for controlling and implementing an authentication process for a user to access the protected applications;
   (b) a first module for randomly generating and encrypting passwords for the protected applications in configured mechanisms;
   (c) user developed tools for housing the protected applications in a network shared drive;

(d) break-glass databases for housing the randomly-generated and encrypted passwords corresponding to the protected applications in the user developed tools;

(e) a second module for registering the user developed tools housing the protected and access-required applications to activate protection on the user developed tools and the protected application(s);

(f) a third module for accessing the protected applications via authenticating whether a user is authorized to access the protected applications, retrieving the encrypted passwords from the break-glass databases, decrypting the encrypted passwords, and using the decrypted passwords to launch the protected applications; and (g) a fourth module for retrieving clear-text passwords for the protected applications, and using the clear-text passwords to launch the protected applications when an emergency occurs.

13. The system of claim 12, wherein the emergency comprises that an application access authentication facility is unreachable and that user logins cannot be validated.

* * * * *